(12) United States Patent
Feldman et al.

(10) Patent No.: US 8,523,386 B2
(45) Date of Patent: Sep. 3, 2013

(54) REINFORCED ILLUMINABLE SAFETY ROPE AND DEPLOYMENT SYSTEM

(76) Inventors: Harold Feldman, Lawrence, NY (US); Guy Danieli, Jerusalem (IL)

(*) Notice: Subject to any disclaimer, the term of this patent is extended or adjusted under 35 U.S.C. 154(b) by 429 days.

(21) Appl. No.: 12/737,695

(22) PCT Filed: Jul. 22, 2009

(86) PCT No.: PCT/US2009/004331
§ 371 (c)(1),
(2), (4) Date: Feb. 4, 2011

(87) PCT Pub. No.: WO2010/016868
PCT Pub. Date: Feb. 11, 2010

(65) Prior Publication Data
US 2011/0134635 A1 Jun. 9, 2011

Related U.S. Application Data

(60) Provisional application No. 61/087,449, filed on Aug. 8, 2008.

(51) Int. Cl.
*F21V 8/00* (2006.01)
(52) U.S. Cl.
USPC ............ 362/234; 362/551; 362/108; 362/253
(58) Field of Classification Search
USPC ................. 362/234, 551, 554, 108, 222, 223, 362/253; 441/13, 16, 133, 134, 136; 29/825
See application file for complete search history.

(56) References Cited

U.S. PATENT DOCUMENTS

| | | |
|---|---|---|
| 5,485,355 A | 1/1996 | Voskoboinik et al. |
| 5,869,930 A | 2/1999 | Baumberg et al. |
| 5,895,299 A | 4/1999 | Hyde |
| 5,934,792 A | 8/1999 | Camarota |
| 6,026,962 A | 2/2000 | Witt et al. |
| 6,257,750 B1 | 7/2001 | Strasser et al. |
| 6,758,314 B2 | 7/2004 | Woodruff |
| 6,830,358 B2 | 12/2004 | Allen |
| 6,957,001 B2 | 10/2005 | He |
| 2005/0152126 A1 | 7/2005 | Hadar |
| 2005/0184674 A1 | 8/2005 | Kaler et al. |
| 2008/0265767 A1 | 10/2008 | Baumberg et al. |

OTHER PUBLICATIONS

International Search Report and Written Opinion, Nov. 16, 2009.

*Primary Examiner* — Sharon Payne
(74) *Attorney, Agent, or Firm* — Abelman, Frayne & Schwab

(57) ABSTRACT

An illuminable safety rope includes an illuminable wire of a predetermined length surrounded by a light-transmitting insulative covering to thereby form an illuminable cable. The insulative covering includes a flange extending radially outward along its length. The flange is defined by opposing side portions and terminates at an edge portion. A fabric material is disposed over and secured to the opposing side and edge portions along at least the length of the illuminable cable to thereby form the safety rope. At least a portion of the illuminable cable opposite the flange transmits light to illuminate the safety rope along its length when the illuminable wire receives power. Additional floatation materials and/or wiring can be provided adjacent the flange and beneath the fabric to enable floatation and/or reinforcement of the rope, or a distress signal to be sent to an alarm.

20 Claims, 10 Drawing Sheets

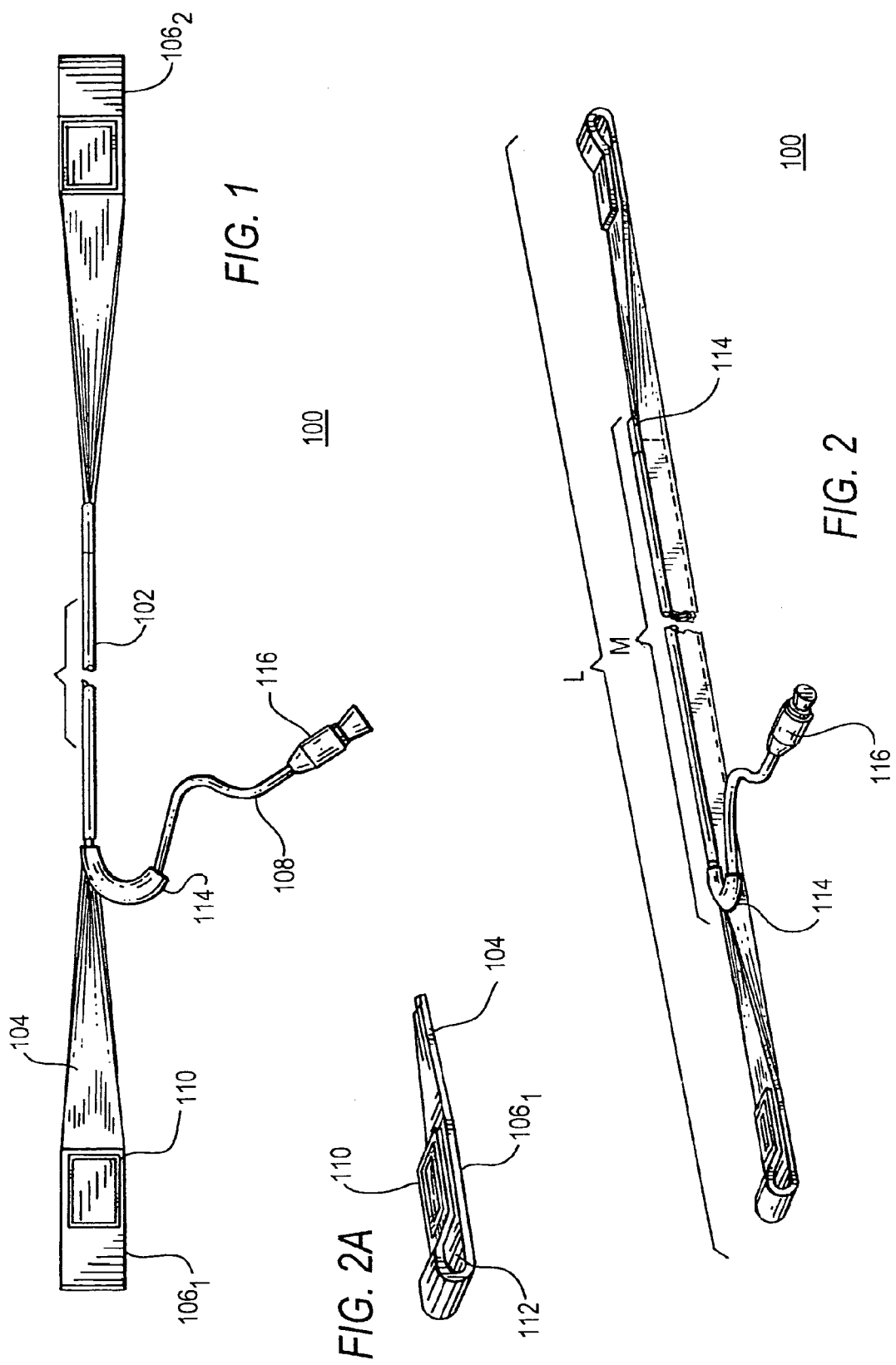

FIG. 6
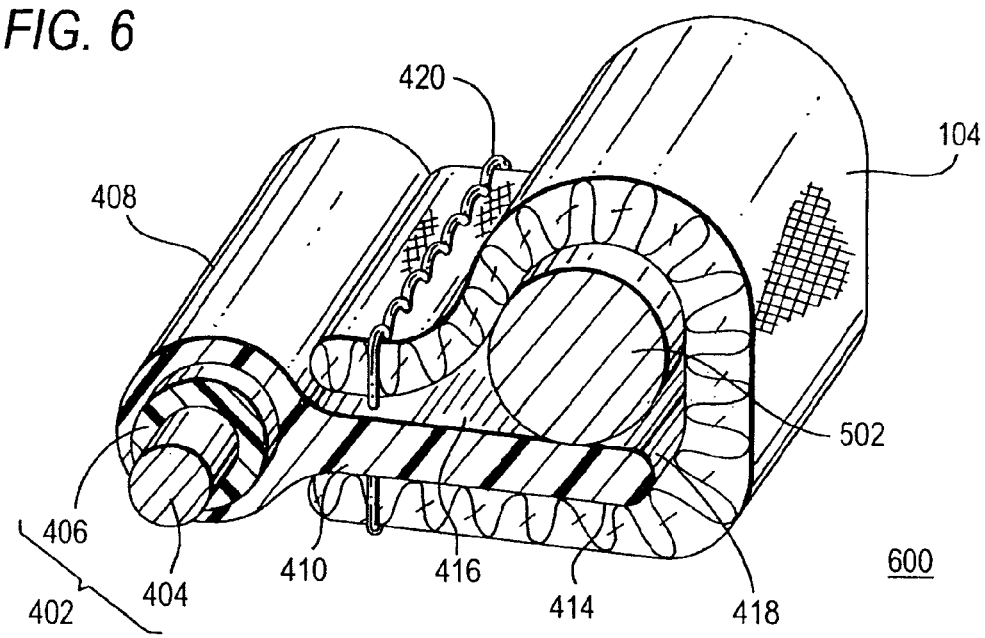
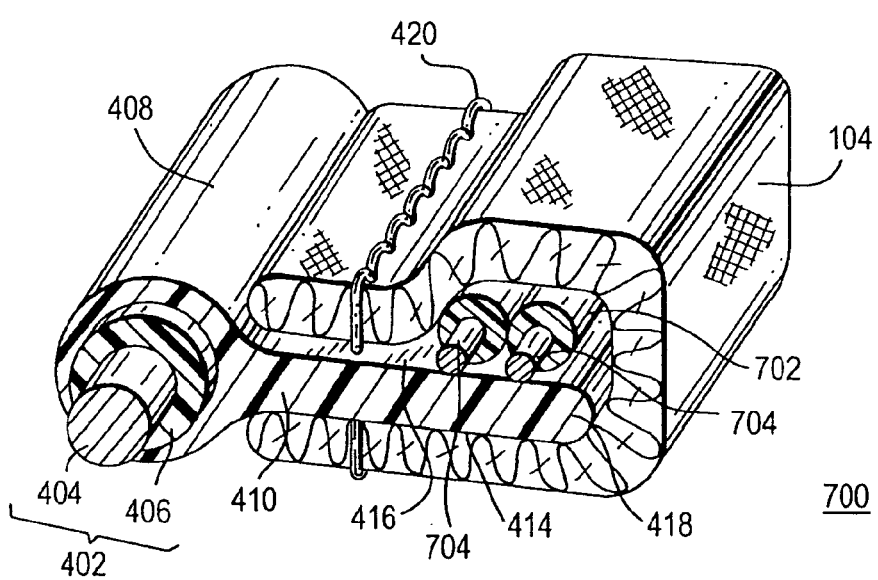
FIG. 7

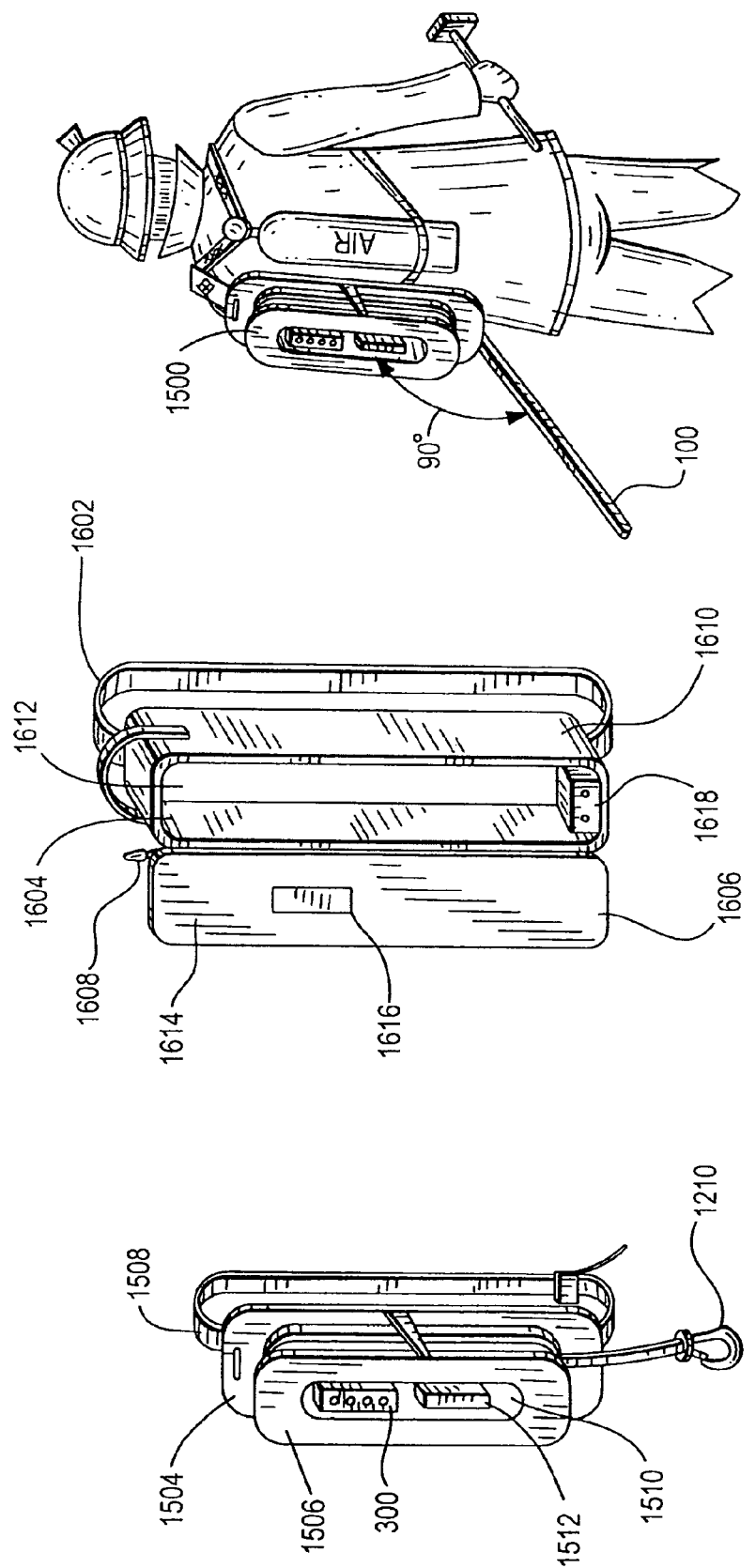

REINFORCED ILLUMINABLE SAFETY ROPE AND DEPLOYMENT SYSTEM

CROSS REFERENCE TO RELATED APPLICATION

This patent application claims benefit under 35 U.S.C. §371 to international application No. PCT/US2009/004331, filed on Jul. 22, 2009, which claims priority to U.S. Provisional Application, Ser. No. 61/087,449, filed Aug. 8, 2008, the contents of which are incorporated by reference herein in its entirety.

BACKGROUND OF THE INVENTION

1. Field of Invention

The present invention relates to safety ropes, and more specifically to an illuminable safety rope and a method and system for fabricating and deploying the same.

2. Description of the Related Art

Safety ropes having various characteristics have been developed to reduce risk to users when endeavoring to overcome hazardous environments. For example, emergency responders such as fire fighters and other rescue personnel exposed to hazardous conditions or environments have often found it useful to include one or more safety ropes to guide or climb as they enter and exit a dangerous location, such as a burning building, darkened tunnel, or other area unfamiliar to the responder. For example, firefighters are constantly forced to enter darkened, smoke-filled environments. Their ability to see is greatly diminished, and the risk of losing their way out, even with a conventional safety rope to help guide them is extreme.

Another hazardous condition in which safety ropes are very helpful is in marine environments, for example, to help rescue persons in the water. During marine based rescue operations, emergency personnel utilize a water resistant throw rope or throw bag to pull a victim out of harms way. As a rope is an important rescue tool, any improvement in the quality of the rope will aid operatives immensely. A person in need of rescue is usually in a distressed state physically and/or mentally. Under best conditions it is often difficult for a person being rescued to find and grab a hold of the rescue rope. Adverse conditions, such as low visibility during nightfall, adverse weather conditions, choppy sea conditions, among other hazardous conditions frustrate rescue operation even further.

To overcome some of the adverse conditions, marine safety operatives often use high powered flood lights to illuminate the person being rescued, however the use of such lighting can temporarily blind and cause difficulty for such person to locate the throw rope. The lack of visibility of these throw ropes has hampered emergency operations, protracting the time and ease of rescue.

US Publication No. 2005/0184674 discloses a linear lighting system including a flexible reinforced electroluminescent (EL) cable, a power module and power management module for use in firefighting, rescue, hazardous materials, law enforcement and other applications to define work zones, hazard zones paths, and the like. The EL wires and cables are described in, for example, U.S. Pat. Nos. 3,819,973 and 5,869,930, and the contents of these patents and publication are incorporated by reference herein in their entireties.

As described in the '930 patent to Baumberg et al., a conductive core wire, such as copper, serves as a first electrode, and is covered by an electrically insulating dielectric layer (e.g., $BaTiO_3$ powder. An electroluminophor layer covers the dielectric layer. The electroluminophor layer can include EL particles and a binder with air-containing pours. A thin electrode layer, such as a gold or copper, covers or can be wound about the electroluminophor layer to form the EL wire. A barrier layer covers the second electrode layer to prevent seepage of a liquid (e.g., ethyl acetate, which wets the binder) through the pours, and a flexible insulating layer such as a polymer (e.g., polyethylene or PVC layer) covers the barrier layer to transform the EL wire to an EL cable. The EL cable described in the abovementioned '674 publication utilizes similar EL wires as disclosed in the '930 patent with a plastic layer(s) disposed there over to form the EL cable.

U.S. Pat. No. 6,758,314 discloses that the EL cabling can be stored on and deployed from a portable reel and drum to which the cable is connected and wound upon. The EL cable is powered by an alternating power source which can include a DC power supply and an inverter. The inverter inverts DC to AC to provide the AC power to the EL cable. The electronics for providing power can be stored in the drum and connected to the EL cable to provide power. Although the reel neatly stores the EL cable, the user must carry the reel and drum to deploy the EL cable. The reel and drum are cumbersome, inflexible, and add undesirable weight to the rescuer's equipment load. Further, the reel cannot be carried by the rescuer in a convenient manner, as it is either carried by hand or bucked to a belt. Moreover, the EL cable can snag or otherwise bind and/or become entangled on the reel when being unspooled during deployment.

Alternatively, the EL cabling can be stored in and deployed from a bag. Although the bag is lighter in weight than the aforementioned reel and drum deployment system, the EL wire is prone to snag, knot or otherwise become entangled while being deployed from the bag if the EL wire is not properly spooled or wound therein:

It is thus desirable to provide an improved safety rope that illuminates along its length and is easy to deploy under poorly illuminated conditions, or under adverse or hazardous conditions, especially in emergency situations. Moreover, it is desirable to provide emergency responders with an illuminated safety rope and deployment system that is user-friendly, reliable, has increased tensile strength, is less costly to manufacture and maintain, and of significantly higher quality than is presently available.

SUMMARY OF THE INVENTION

The disadvantages associated with the prior art are overcome by the present invention which provides an illuminable safety rope and deployment system. In one embodiment, an illuminable safety rope includes an illuminable wire having a predetermined length and an insulative covering surrounding the illuminable wire along the length to thereby form an illuminable cable. In one embodiment, the illuminable wire includes an electroluminescent (EL) wire. In another embodiment, the illuminable wire includes fiber optic filaments. Alternatively, the illuminable wire includes light emitting diodes (LEDs). The insulative covering includes a flange extending radially outward along the length of the illuminable cable, where the flange is defined by opposing side portions that terminate at an edge portion. A fabric material is disposed over and secured to the opposing side and edge portions at least the length of the illuminable cable to thereby form the safety rope. A portion of the illuminable cable opposite the flange transmits light to illuminate the safety rope along its length when the illuminable wire receives power. The illuminating safety rope is especially useful in during dark or hazardous operations where visual conditions are severely hampered by, for example, in smoke-filled and/or gas-filled environments, during night time operations or when submerged under water. Moreover, its increased strength enables rescuers to support or pull weights greater than 1000 lbs.

A method of fabricating the illuminable safety rope includes providing an illuminable wire having a predetermined length; forming an insulative covering over the illuminable wire along the length to form an illuminable cable, the insulative covering having a protruding flange extending radially outward along the length, the flange being defined by a opposing side portions and terminating at an edge portions; and providing a fabric material disposed over the opposing side portions and edge portion at least the length of the illuminable cable to form the safety rope, wherein a portion of the illuminable cable facing opposite of the edge portion of the flange is exposed to illuminate the safety rope along its length upon receiving power to the illuminable wire.

Additional features can be included to the illuminable safety rope. For example, a floatation material can be placed along one side or around the entire flange to provide buoyancy and enable the safety rope to float. A floating safety rope is advantageous in water rescue operations.

As a further alternative, reinforcing wire can be included adjacent or over the flange to provide additional strength to the safety rope. Moreover, electrical wiring can be provided adjacent the flange and beneath the fabric to enable a responder to send a distress signal to an alarm station near other responders by activating a manual switch.

In one embodiment, directional or distance markers can be provided on the flat surface of the safety rope. The directional or distance markers can assist a responder in identifying his position relative to the starting point and/or in returning safely to the point of entry of a rescue site.

In another embodiment, loop knots, such as lineman loop knots, can be provided to enable additional safety ropes to be attached to a primary safety rope. In this manner two or more responders can enter a rescue site and branch out in different directions to perform a search. The loop knots loop around the primary safety rope and the secondary safety ropes can be attached to the loop knots using a fastener, such as a carabiner. The loop knots can include reflective tape or other reflective materials that assist rescuers in seeing the loop knot from the reflected light of the illuminated safety rope, thereby making it easy to latch on, for example, using a carabiner.

Various safety rope deployment systems are also disclosed herein. In one embodiment, a rope bag can be used to store and deploy the illuminable safety rope. The rope bag can be worn over a shoulder of a rescuer and one end of the safety rope is fastened to a fixed structure at the entry site of the rescue operation. As the responder traverses the rescue site, the safety rope unravels and provides an illuminated lifeline back to the point of entry.

Alternatively, a reel having a spool with flexible flanges can be used to deploy the safety rope. The safety rope is wound around the spool and the reel is worn over the shoulder and on the back of the responder. In a similar manner as described above for the rope bag, as the responder traverses into the rescue site, the safety rope unwraps from the spool and provides an illuminated lifeline back to the point of entry.

In another aspect of the deployment system, a coiling jig for wrapping an elongated flexible member, such as the illuminable safety rope, in a serpentine configuration includes a pair of opposing elongated side members, a cross-member coupled at each end of the opposing elongated side members. Each elongated side member includes a plurality of undulations. The plurality undulations of each elongated side member oppose each other to define a plurality of opposing paired undulations. Each opposing paired undulations is spaced apart from a next pair of paired undulations a distance to systematically receive a portion of the elongated flexible member. Portions of the length of the elongated flexible member are wrapped around the opposing pairs of undulations sequentially to form the serpentine configuration. In an embodiment, each undulation extends normal to the elongated members at an angle in a range of approximately eighty to ninety degrees.

BRIEF DESCRIPTION OF THE DRAWINGS

The teachings of the present invention can be readily understood by considering the following detailed description in conjunction with the accompanying drawings in which:

FIG. 1 depicts a top plan view of a illuminable safety rope of the present invention configured for coupling to a portable power source;

FIG. 2 depicts a top right side perspective view of the illuminable safety rope of FIG. 1 illustrating the opposing fabric ends thereof;

FIG. 2A depicts an enlarged top right side perspective view of an end of the illuminable safety rope of FIG. 2;

FIG. 6 depicts a top right perspective view of yet another embodiment illustrating a section of the illuminable safety rope with a reinforcing wire therein;

FIG. 7 depicts a top right perspective view of still an embodiment illustrating a section of the illuminable safety rope with a reinforcing wire therein.

FIG. 15 depicts a top front perspective view of a flexible spool for wrapping the illuminable safety rope thereabout for storage and deployment while being worn over a shoulder of a responder;

FIG. 16 depicts a top front perspective view of a case for storing the flexible spool of FIG. 15;

FIG. 17 depicts a rear view of a rescue responder wearing the flexible spool with the illuminable safety rope of FIG. 15 over the shoulder during deployment;

Figure 3A:
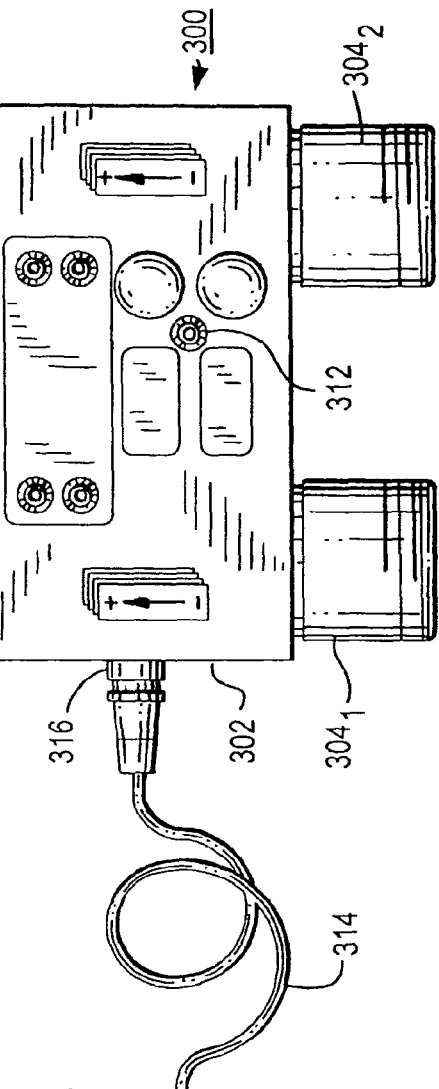
FIGS. 3A and 3B, respectively, depict an elevated front view and a bottom left side perspective view of a portable power source suitable for providing power to the illuminable safety rope of FIG. 1.

To facilitate an understanding of the invention, the same reference numerals have been used, when appropriate, to designate the same or similar elements that are common to the figures. Unless stated otherwise, the features shown in the figures are not drawn to scale, but are shown for illustrative purposes.

DETAILED DESCRIPTION OF THE INVENTION

The present invention is an illuminable safety rope and deployment system. The illuminable safety rope along with the deployment system can be used in situations where a rope is deemed useful, and especially in poorly lit or hazardous environments, such as smoked filled rooms during a fire, marine rescues, or other hazardous climbing or rescue situations. The illuminable safety rope and deployment system of the present invention is particularly useful for rescue and police personal such as fireman, police, the Coast Guard personal, scuba divers, rock climbers or any other individual that may be exposed to dark or hazardous environments.

Referring to FIGS. 1, 2 and 2A, the illuminable safety rope 100 of the present invention is illustratively shown. In one embodiment, the safety rope 100 includes an electroluminescent (EL) cable portion 108 and a fabric portion 104. Specific details of the EL cable portion 108 and fabric portion 104 and their construction are described in further detail with respect to FIGS. 4-9. Alternatively, the safety rope 100 can be illuminated by providing fiber optic cabling 1800 or light emitting diodes (LEDs) 1900, as illustratively shown with respect to FIGS. 18 and 19. Although the present invention is predominantly described herein with respect to the EL wire, a person of ordinary skill in the art will appreciate that the features of the present invention are also applicable to the safety ropes 100 having fiber optic cabling or LEDs. For example, the power source to power the EL wire of the safety rope as described below with respect to FIG. 3 can be readily adapted or modified by persons of ordinary skill in the art to provide power to either the fiber optic cabling or the LEDs.

The safety rope 100 further includes opposing ends $106_1$ and $106_2$ (collectively ends 106) that define a predetermined length (referenced as "L" in FIG. 2) of the safety rope 100. Referring to FIG. 2A, the ends 106 of the safety rope 100 can be looped back over and stitched or otherwise bonded 110 to form a loop 112. The loops 112 are preferably provided to facilitate attachment of the illuminable safety rope 100 to another object. For example, during rescue operations, it is often desirable to fasten a first end $106_1$ of the safety rope 102 to a fixed structure such as a door or beam in a building, and the opposing second end $106_1$ to the rescuer, either directly or through a rope bag, reel or other deployment system, as described in further detail with respect to FIGS. 12-17.

As shown in FIGS. 1 and 2, the length "L" of the fabric portion 104 extends a distance greater than the length "M" of the EL cable portion 108. The added length of fabric at each end can facilitate the attachment of the safety rope 100 to an object as described above. The opposing ends of the EL cable portion 108 are reinforced with a flexible cap or shrink wrap 114. The end caps 114 can be fabricated from a heat resistant material, such as polyolefin tubing and the like. The safety rope 100 is configured for coupling to a portable power source, such as the power source 300 illustratively shown in FIG. 3, via a connector 112, as described below in further detail. Specifically, a power connector 116 is provided at a free end of the EL cable portion 108. The power connector 116 can be plugged or otherwise securely coupled directly to the power source 300 or to an extension cord, which is coupled to the power source 300.

Figure 3B:
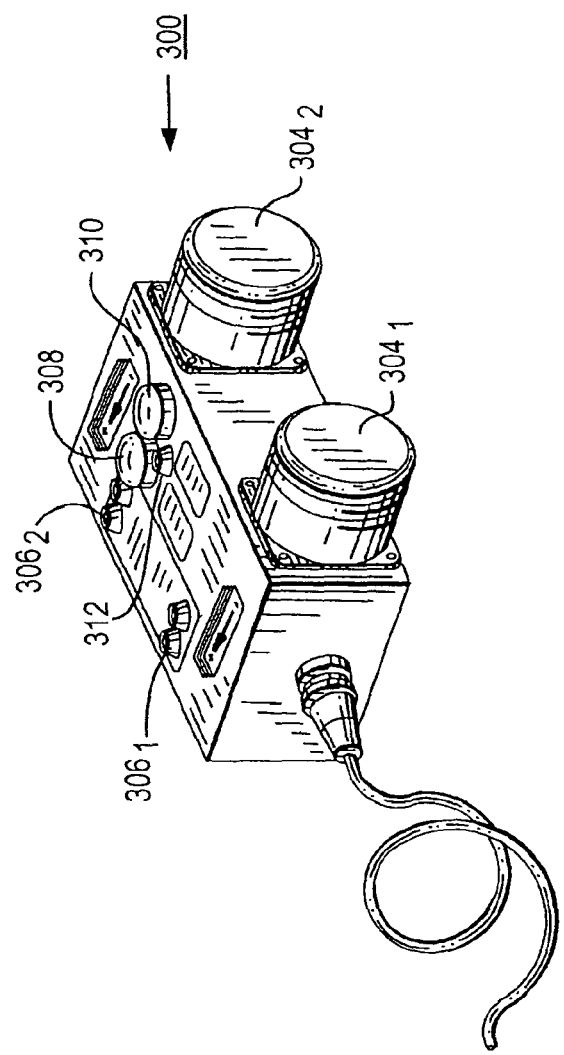

Referring now to FIGS. 3A and 3B, an illustrative power source 300 is shown. The power source 300 is preferably portable and includes a direct current (DC) voltage source 304 and an inverter (not shown) for converting the DC voltage to an alternating current (AC) signal to illuminate the EL cable portion 108 of the safety rope 100 in a well known manner. Alternatively, an AC voltage source can be used with a step-down transformer to provide the necessary current signal to the safety rope 100.

Where the portable power source 300 is being used, the DC voltage source 304 can include at least one, and preferably two batteries (or battery packs) $304_1$ and $304_2$, which are housed in the housing 302 of the power source 300 to provide redundancy. A power outlet 316 is provided to deliver the AC signal to the safety rope 100. In one embodiment, the connector 116 can be inserted directly into and secured to the power outlet 316. Alternatively, an extension cord 314 can be coupled between the power source 300 and the connector 116.

In one embodiment, voltage indicators such as LEDs $306_1$ and $306_2$ (collectively voltage indicators 306) are provided for each battery. For example, a first LED can be provided to illuminate a green light to indicate power on and suitable voltage capacity, and a second LED can be provided to illuminate a red light to indicate low voltage capacity. A manual switch (not shown) can be provided to switch between the redundant batteries 304. Alternatively, and preferably, a control module (not shown) in the housing will switch between redundant batteries in low voltage conditions automatically.

In a preferred embodiment, a mode switch 312 is provided to change the mode of operation of the safety rope 100 between continuous illumination and intermittent (e.g., blinking) illumination. Indicator lights 308 and 310 can be provided to illuminate when operating in either continuous or intermittent modes, respectively.

Figure 4:
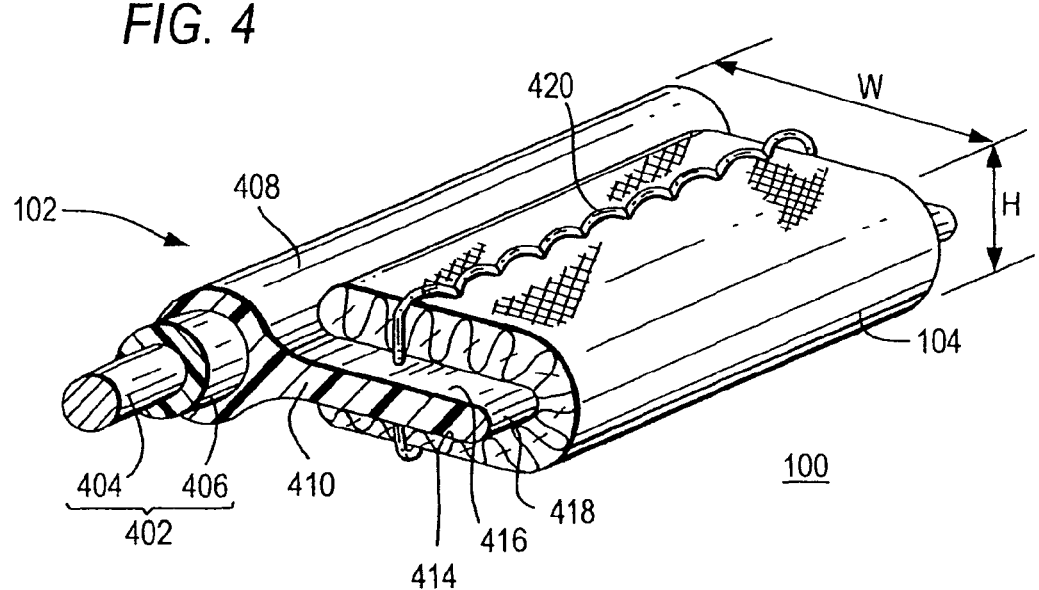
FIG. 4 depicts a top right perspective view of an embodiment illustrating a section of the illuminable safety rope of FIG. 1.

Referring to FIG. 4, a first embodiment illustrating a section of the illuminable safety rope 100 of FIG. 1 is shown. The safety rope 100 includes an electroluminescent (EL) wire 402 having a predetermined length and an insulative covering 408 surrounding the EL wire 402 along the length, which together forms the EL cable 102. The EL wire 402 is formed by a core conductor or electrode 404 and a second electrode having luminescent particles or coating formed thereon. The fabrication and operation of the EL wire is provided for better understanding, but does not form a part of the present invention. However, for a detailed understanding of the fabrication and operation of an illustrative EL wire 402, as well and an EL cable 102, the disclosures of previously noted U.S. Pat. Nos. 3,819,973 and 5,869,930 provide illustrative examples.

The insulative covering 408 has a flange 410 protruding (i.e., extending) radially outward along the length "M" of the EL cable 102. The flange 410 is defined by a top portion 416, bottom portion 414 (i.e., opposing side portions) and terminates at an edge portion 418. An EL cable 102 illustratively suitable for implementation in the present invention is a LYTEC® T-Type EL cable, provided by Elam-Electroluminescent Industries, Ltd. of Jerusalem, Israel.

The fabric material 104 is a flexible heat-resistant material, such as NOMEX, KEVLAR and the like, and is disposed over the top, bottom and edge portions at least the length of the EL cable 102 to thereby form the safety rope 100 of the present invention. Specifically, the fabric material 104 wraps around the top, bottom and edge portions of the flange 410. The fabric material 104 is used to reinforce the EL cable 102 and is strong enough to support weights of approximately 1,000 lbs. or more. The fabric material 104 does not cover the entire EL cable 102. Rather, a portion of the EL cable 102 facing opposite of the edge portion 414 of the flange 410 is left exposed. In this manner, the exposed portion of the EL cable transmits light emitted by the EL wire 402 to thereby illuminate the safety rope 100 along its length upon receiving power to the EL wire 402 from the power source 300. The fabric can be formed from a reflective or transparent or translucent material. Further, the fabric material 104 can be woven and is preferably flexible to permit it to be coiled, as well as readily pass around corners and other objects.

Preferably, the fabric material 104 is stitched 420 to the flange 410 on the bottom 414 and top 416 portions. A single row of stitching 420 is illustratively shown in FIG. 4. However, a person of ordinary skill in the art will appreciate that the fabric 104 can be double-stitched to provide greater strength. The thread used to stitch the fabric 104 to the flange 410 is preferably fabricated from a heat resistant thread material, such as ceramic fiber, reinforced glass fiber, and the like.

Figure 5:
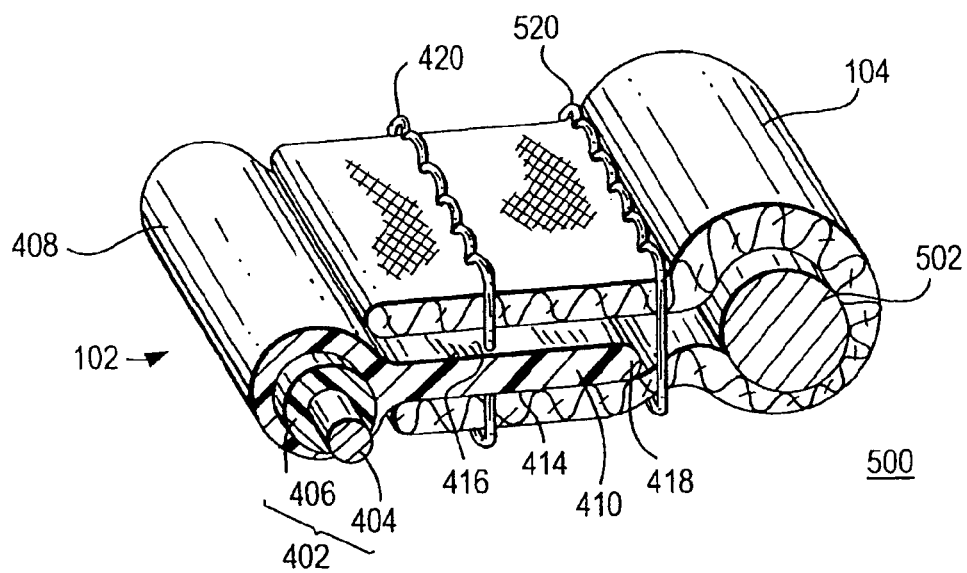
FIG. 5 depicts a top left perspective view of another embodiment illustrating a section of the illuminable safety rope with a reinforcing wire therein.

Referring to FIG. 5, a second embodiment of the safety rope 500 is illustratively shown. The safety rope 500 includes the same EL cable 102 with the flange 410 as shown in FIG. 4, however, a flexible reinforcing wire 502 is positioned adjacent the edge portion 418 of the flange 410. The reinforcing wire preferably extends along the length "M" of the EL cable 102. Illustrative examples of a flexible reinforcing wire 502 suitable for use include copper or aluminum wires having a gauge in the range between 18 and 10 (AWG) or a cross-sectional area of 0.8 mm to 5.5 mm, although such dimensions are not considered limiting. A reinforcing wire fabricated from a non-metal material, such ceramic, glass rope and the like are also suitable for use in the present invention.

During manufacture, the pre-cut length of fabric is placed along the lower portion 414 of the flange 410 and wrapped around the reinforcing wire 502 positioned adjacent the flange edge 418, and over the top portion 416 of the flange 410. Stitching 420 is provided in at the top and bottom of the safety rope 100 through the flange 410. Preferably, a second stitching 520 is provided through the top and bottom of the safety rope 100 between the edge 418 of the flange 410 and the reinforcing wire 502. In this manner, the reinforcing wire 502 is snugly wrapped and secured adjacent to the edge 418 of the flange 410 without slippage.

Referring to FIG. 6, a variation of the safety rope 500 is illustratively shown. The safety rope 600 is the same as the safety rope 500 of FIG. 5, except that the reinforcing wire is positioned on the top portion 416 or bottom portion 414 (i.e., a side portion) of the flange 410. The fabric material 104 is wrapped around the bottom portion 414 and edge 418 portions of the flange 410, and then over reinforcing wire 502. The fabric 104 is then stitched 420 along the top and bottom of the safety rope 100 and through the opposing sides of the flange 410.

Referring to FIG. 7, a third embodiment of the safety rope 700 is illustratively shown. The safety rope 600 is the same as the safety rope 500 of FIG. 6, except that the reinforcing wire 702 includes two core elements 704 with an insulation cover, such as zip cord or twisted pair, positioned on the top portion 416 or bottom portion 414 (i.e., a side portion) of the flange 410. The fabric material 104 is wrapped around the bottom portion 414 and edge 418 portions of the flange 410, and then over double core reinforcing wire 702. The fabric 104 is then stitched 420 along the top and bottom of the safety rope 100 and through the opposing sides of the flange 410 as described above.

The safety rope 700 of FIG. 7 can be especially useful for providing a communication signal path to send a distress signal to other responders. In particular, the paired wire elements 704 can be coupled to a switch or button on the power supply 300 which can be activated to send an electrical signal from the responder to an alarm device such as, for example a light, audible alarm or combination thereof.

Figure 8:
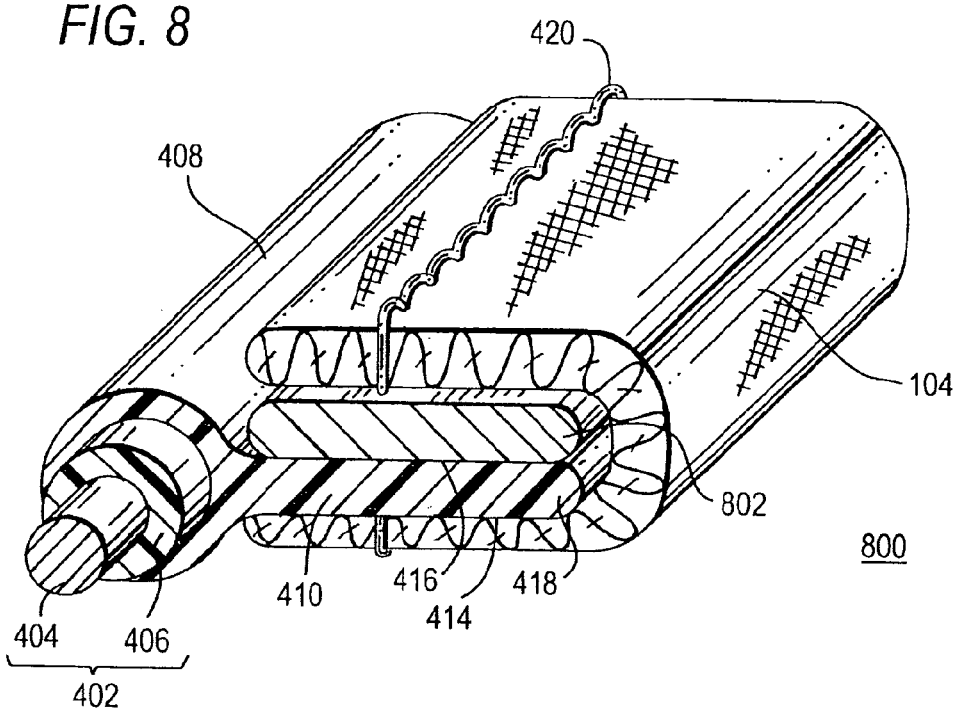
FIG. 8 depicts a top right perspective view of an embodiment illustrating a section of the illuminable safety rope with a floatation material therein.

Referring to FIG. 8, a fourth embodiment of the safety rope 800 is illustratively shown. The safety rope 800 is the same as the safety rope 100 of FIG. 4, except that a floatation material 802 is positioned on the top portion 416 or bottom portion 414 (i.e., a side portion) of the flange 410. The floatation material 802 can be fabricated from foamed polyethylene, among other buoyant materials. The floatation material 802 has enough buoyancy to enable the safety rope 100 to float in liquid environments, such as water, oil slicks, and the like. The fabric material 104 is wrapped around the bottom portion 414 and edge 418 portions of the flange 410, and then floatation material 802. The fabric 104 is then stitched 420 along the top and bottom of the safety rope 100 and through the opposing sides of the flange 410 as described above.

Figure 9:
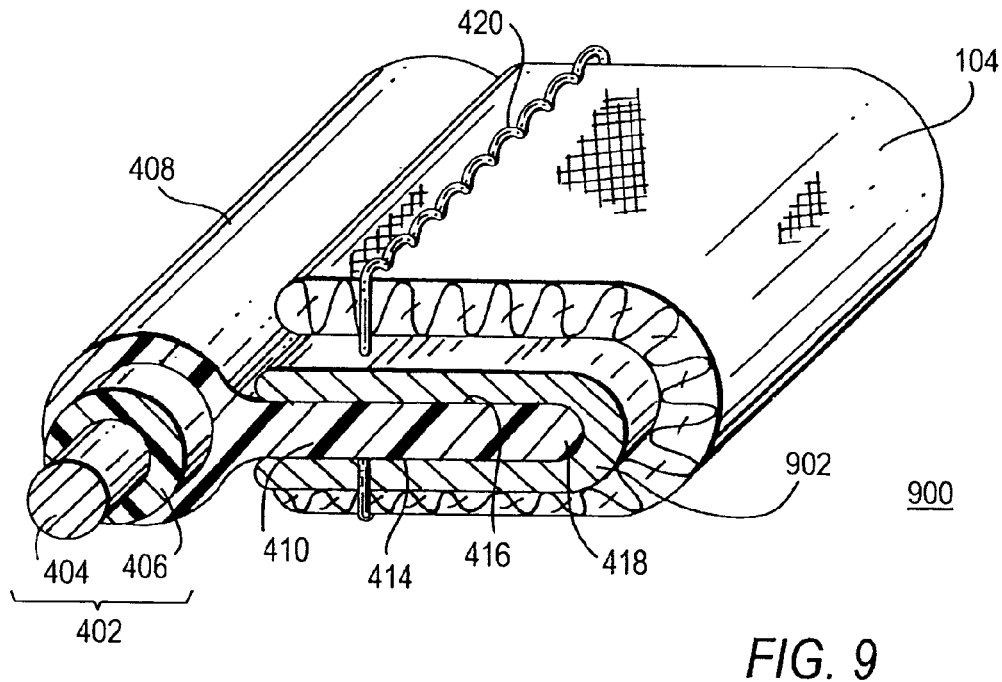
FIG. 9 depicts a top right perspective view of another embodiment illustrating a section of the illuminable safety rope with a floatation material therein.

Referring to FIG. 9, a variation of the safety rope 800 of FIG. 8 is illustratively shown. The safety rope 900 is the same as the safety rope 800, except that a floatation material 902 is positioned on the top portion 416 and bottom portion 414 (i.e., both side portions) and edge 418 of the flange 410. The more than doubling of the volume of floatation material 902 improves the buoyancy of the safety rope 100 to enable it to float upward in deeper depths of liquid environments. For example, scuba divers may find this embodiment of the safety rope 900 preferable, since the tendency of the safety rope 900 to float upwards is increased. The fabric material 104 is wrapped around the outer circumference of the floatation material 902, which is positioned over the opposing side portions 414, 416 and edge 418 portion of the flange 410. The fabric 104 is then stitched 420 along the top and bottom of the safety rope 100 and through the floatation material 902 and opposing sides of the flange 410 in a similar manner as described above.

Figure 18:
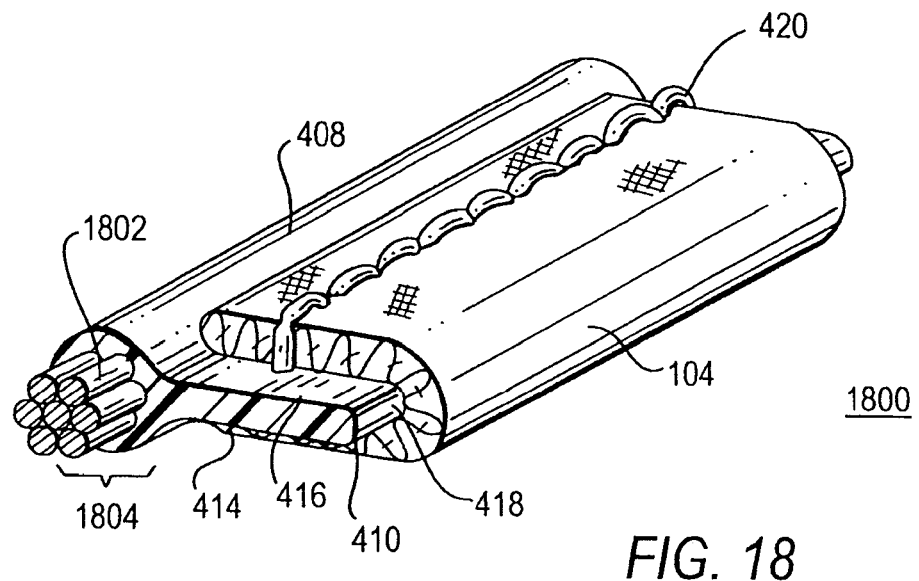
FIG. 18 depicts a top right perspective view of an embodiment illustrating a section of the illuminable safety rope of FIG. 1 with fiber optic cabling.

Referring to FIG. 18, a fifth embodiment of the illuminable safety rope 1800 is illustratively shown. The safety rope 1800 is the same as the safety rope 100 of FIG. 4, except that a plurality of fiber optic wire filaments 1802 is provided instead of the EL wire 402. The plurality of fiber optic filaments or wires 1802 is covered by a light-transmitting insulative covering 408 to form a fiber optic cable 1804. The insulative covering 408 is transparent, thereby enabling the fiber optic wires 1802 to illuminate along its entire length. As described above with respect to FIG. 4, the insulative covering 408 has a flange 410 protruding (i.e., extending) radially outward along the length "M" of the fiber optic cable 1804. The flange 410 is defined by a top portion 416, bottom portion 414 (i.e., opposing side portions) and terminates at an edge portion 418. The fabric material 104 and its positioning over the flange, as well as the stitching can be provided in similar manner as described above with respect to FIG. 4. Further, the reinforcing wires, electrical wires and floatation materials can also be positioned adjacent the flange 410 and beneath the fabric 104 in a similar manner described with respect to FIGS. 5-9.

Figure 19:
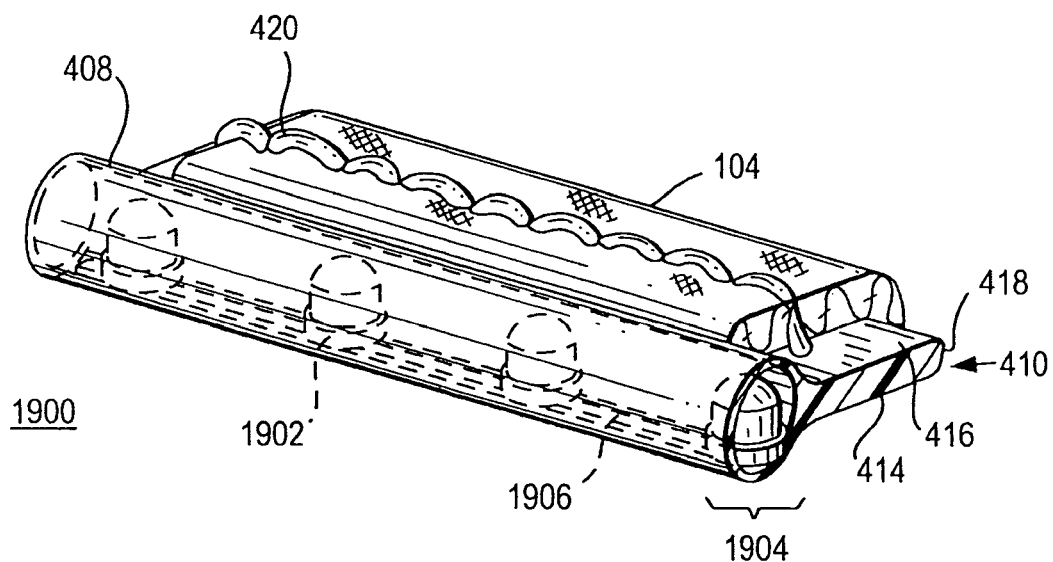
FIG. 19 depicts a top left perspective view of an embodiment illustrating a section of the illuminable safety rope of FIG. 1 with light emitting diodes.

Referring to FIG. 19, a sixth embodiment of the illuminable safety rope 1900 is illustratively shown. The illuminable safety rope 1900 is the same as the safety rope 100 of FIG. 4, except that a plurality of serially coupled light-emitting diodes (LEDs) 1902 is provided instead of the EL wire 402 (or fiber optic filaments 1802 of FIG. 18). The plurality of LEDs 1902 is covered by a light-transmitting insulative covering 408 to form an LED cable 1904. In an embodiment, the insulative covering 408 is transparent, thereby enabling the LEDs 1902 to illuminate along its entire length. Preferably, the insulative covering 408 is translucent to diffuse the light along the length of the safety rope 1900. The LEDs 1902 are serially connected by a pair of conductors, such as copper wiring, and can be spaced apart from each other in a range of 6-12 inches, although such distances are not considered limiting. As described above with respect to FIG. 4, the insulative covering 408 has a flange 410 protruding (i.e., extending) radially outward along the length "M" of the fiber optic cable 1804. The flange 410 is defined by a top portion 416, bottom portion 414 (i.e., opposing side portions) and terminates at an edge portion 418. The fabric material 104 and its positioning over the flange, as well as the stitching can be provided in similar manner as described above with respect to FIG. 4. Further, the reinforcing wires, electrical wires and floatation materials can also be positioned adjacent the flange 410 and beneath the fabric 104 in a similar manner described with respect to FIGS. 5-9.

A person of ordinary skill in the art will appreciate that variations and combinations of the aforementioned illuminable safety rope embodiments can be provided. For example, a safety rope having both a reinforcing wire and floatation material can be readily fabricated from the disclosure above. Moreover, the strength of the safety rope will be increased depending on the gauge and/or characteristics of the wire being used. Moreover, for marine environments or where high voltage lines are prevalent at the hazardous site, safety-ropes with insulative (i.e., non-metal) reinforcing wires are preferred to diminish corrosion and conductivity of the safety rope. Further, single or double stitching of the fabric 104 to the EL cable 102 can be used, based on the thread strength and desired flexibility of the safety rope 100.

The lengths L of the safety rope 100 are preferably fabricated in 50 ft, 75 ft, 100 ft, and/or 150 ft lengths, although such lengths are not to be considered as limiting. The height "H" of the safety rope 100 as shown in FIG. 4 can be in a range of 0.4 to 0.8 inches, and the width "W" of the safety rope 100 as shown in FIG. 4 can be in a range of 0.12 to 0.2 inches, the dimensions being dependent upon various factors including the thickness of the fabric 104, the reinforcing wires 502, 702 and the floatation material 802, 902 and their positioning with respect to the flange 410, and such dimensions are not considered limiting.

Figure 10:
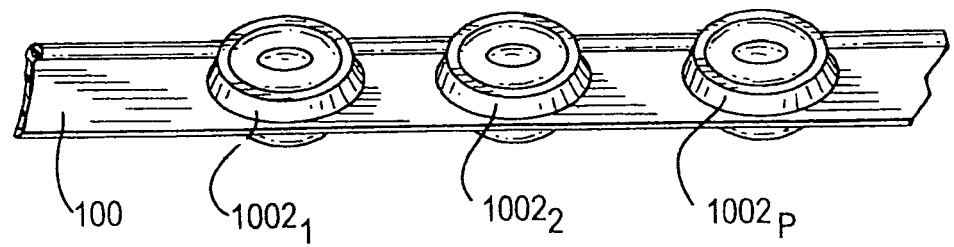
FIG. 10 depicts a top perspective view of the safety rope of FIG. 1 having distance indication markers provided thereon.

Referring to FIG. 10, distance indication markers can be provided to any of the aforementioned illuminable safety ropes. For example, the distance markers are spaced along the length of the safety rope 100 at predetermined intervals. For example, a single distance marker can be provided on the safety rope 100 at a first 10 foot interval, two adjacent distance markers can be provided on the safety rope 100 at a second 10 foot interval (i.e., 20 feet from the end) and so forth. As shown in FIG. 10, three circular distance markers $1002_1$ through $1002_3$ (collectively distance markers 1002) are fastened to the safety rope 100 on both sides (e.g., representing a 30 ft distance from the end of the rope). The distance markers 1002 can be riveted, sewn or otherwise bonded to either or both sides of the safety rope 100. Although the distance markers 1002 are illustratively circular in shape, such shape is not limiting, as other shapes, including directional arrows can be utilized.

Figure 12:
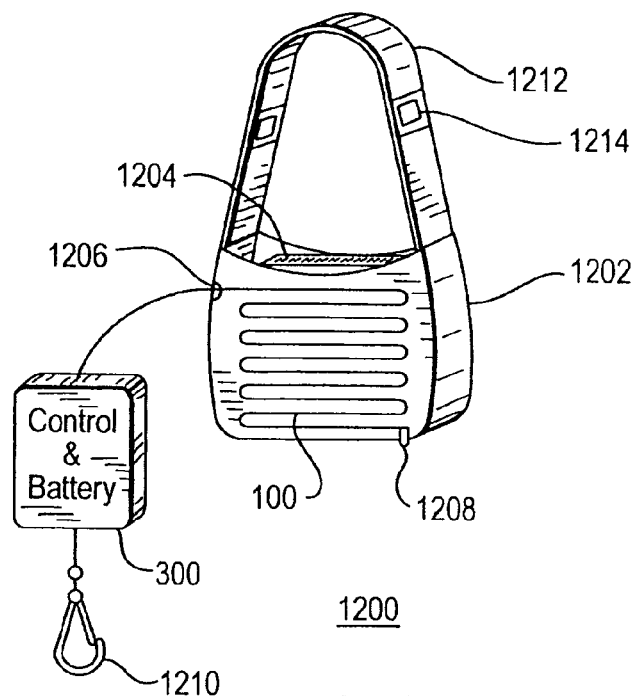
FIG. 12 depicts a right front perspective view of a rope bag illustrating the illuminable safety rope being deployed after being coiled in a serpentine arrangement.

During use, the responder (e.g., rescuer) attaches a first end $106_1$ to a fixed object using a fastener, such as a carabiner 1210 (See FIG. 12). As the responder moves into the hazardous or dark environment, the rope is unraveled or otherwise uncoiled with minimal slack. An advantage of the distance markers is if the responder becomes entrapped or otherwise requires assistance, the distance markers can be used to determine the distance traveled, which can be communicated by the responder to others for further assistance.

Figure 11:
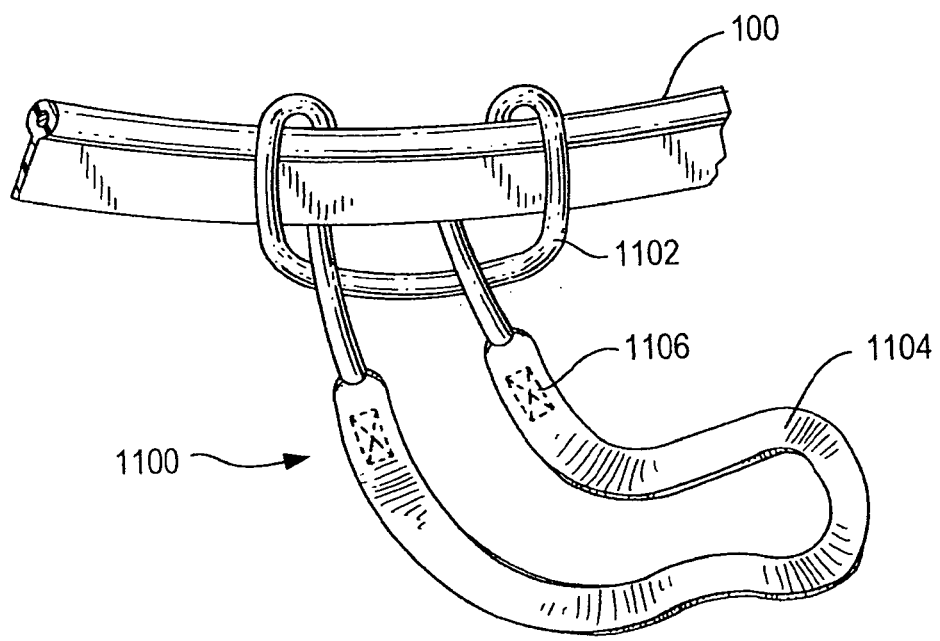
FIG. 11 depicts a bottom perspective view of a loop attachment for securing a carabiner to the safety rope of FIG. 1.

Referring to FIG. 11, a lineman's loop knot 1100 is illustratively shown disposed over the safety rope 100. The loop knot 1100 can be useful to attach secondary safety ropes therefrom, such that two or more responders can enter a darkened or hazardous area and branch out from a single safety rope. The loop knot 1100 can be fabricated from the heat resistant fabric used to form the fabric portion 104 of the safety rope 100 or any other heat resistant material it can have reflective material to reflect light from the el wire. The loop knot 1100 is a fabric loop that can be wrapped around the safety rope in a manner as shown in FIG. 11. In one embodiment, the loop knot 1100 includes a first portion 1102 made from a fabric having a high coefficient of friction to prevent slippage, and a second portion 1104 made from a fabric having a smooth textured surface to prevent the carabiner 1210 from binding. The two portions can be stitched 1106 or otherwise secured together in a well known manner to form the loop knot 1100. Alternatively, the loop knot can be fabricated from a single fabric material. The fabric loop can be reinforced with an internal wire in a similar manner as the reinforcing wire of the safety rope described above, except that the EL cable is not provided. Multiple loop knots 1100 can be utilized as required. A carabiner 1210 attached to an end of a secondary safety rope can readily be attached around the loop knot 1100.

Any of the above-described illuminable safety rope can be deployed by rescue personnel, responders, or any other individual in various ways. The safety rope is flexible and can be coiled by hand and carried over a shoulder or around a belt loop of the individual. However, various shaped bags and coiling equipment can be useful to store and deploy the safety rope to prevent entanglements and keep is clean, among other advantages as described below with respect to FIGS. 12-17.

Referring to FIG. 12, an illuminable safety rope deployment system 1200 is illustratively shown. The deployment system 1200 includes the illuminable safety rope (e.g., generally 100, but can be any of the aforementioned embodiments 500, 600, 700, 800, 900, 1800, 1900 or other derivations thereof), which is coiled and stored in a rope bag 1202 for deployment. The rope bag 1202 includes a first opening 1204 for placing the coiled safety rope 100 therein, a second opening or port 1206 for deploying the safety rope, and a strap handle 1212 for carrying the deployment system 1200. Optionally one or more fasteners 1214 can be provided to detach and attach the strap handle 1212 from the rope bag 1202.

The safety rope 100 is coiled, for example, in a serpentine arrangement using coiling jig 1300 of FIG. 13, as describe below in further detail. The coiled rope is inserted in the rope bag 1202 through the first opening 1204 and a first end $106_1$ of the rope 100 can be fastened at its loop 112 to a hook, carabiner or other fastener 1208 secured within the interior of the bag 1202. The free second end $106_2$ of the rope is fed through the second opening 1206 and is external to the rope bag 1202. The second opening 1206 is sized slightly larger than the cross-sectional dimensions of the safety rope 100 to allow the rope to be pulled therethrough and uncoiled in the rope bag 1202 without binding. The second end $106_2$ of the rope is physically and electrically coupled to the power source 300 via the connector 116 as described above with respect to FIGS. 1-3. The power supply 300 preferably includes a loop or other connector formed on the housing 302 to enable attachment of a carabiner 1210 or other fastener that can secure the power supply 300 and the second end $106_2$ of the safety rope to a fixed object.

During deployment, a responder attaches the carabiner 1210 to a fixed object, such as a pole, turns the power supply 300 on, and carries the rope bag 1202 in hand or over a shoulder. As the responder walks away from the fixed object, the safety rope is pulled through the second opening 1206 and uncoils from the bag 1202. The safety rope is illuminated and provides light to enable the responder or others to find their way in dark or otherwise adverse conditions. Once the responder returns with the safety rope 100 and bag, the safety rope can be recoiled and stored in the bag for future use. Alternatively, the electronic power supply 300 can be attached to the first end $106_1$ and carried with the rescuer while the second end $106_2$ of the safety rope is attached to the fixed object.

Figure 13:
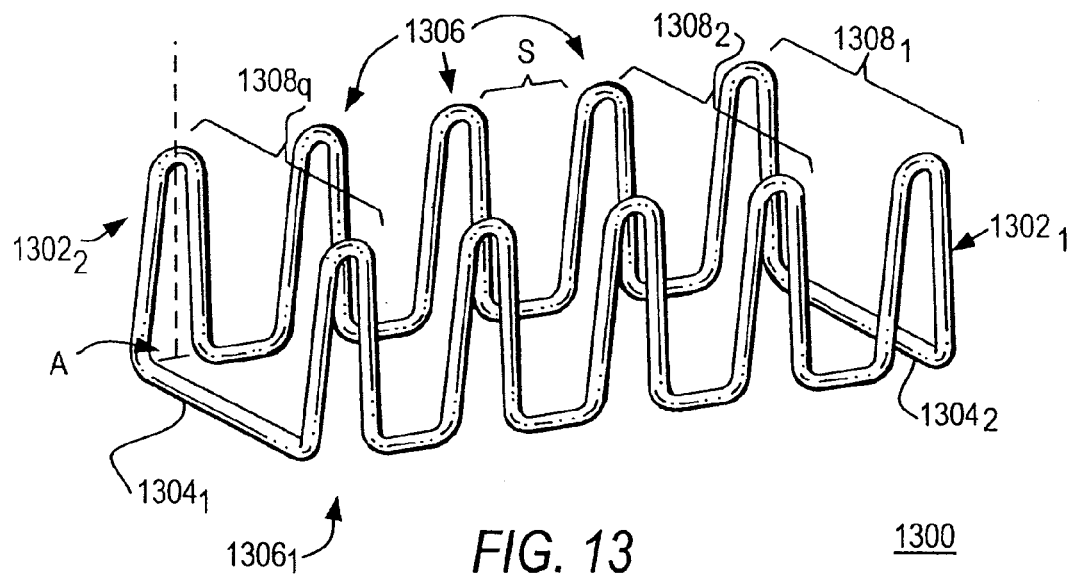
FIG. 13 depicts a right top perspective view of a coiling jig for coiling the illuminable safety rope of the present invention in a serpentine arrangement for placement into a rope bag.
Figure 14A:
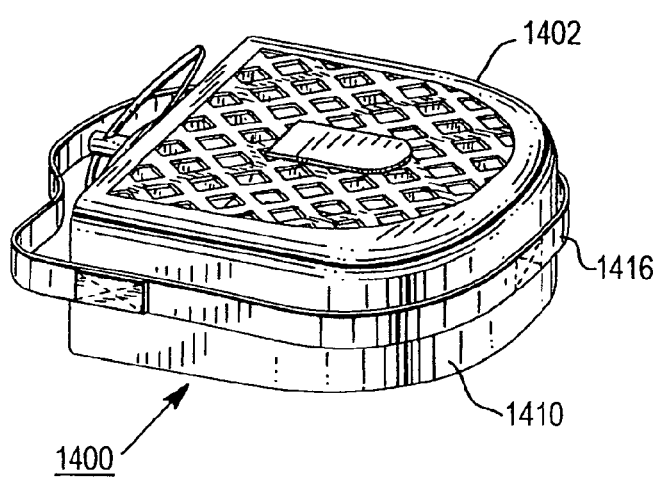
FIGS. 14A-14D, respectively, depict bottom left side perspective, side elevational, front elevational, and top plan elevational views illustrating a floating rope bag suitable for storing and deploying the illuminable safety ropes of FIG. 8 or 9.
Figure 14B:
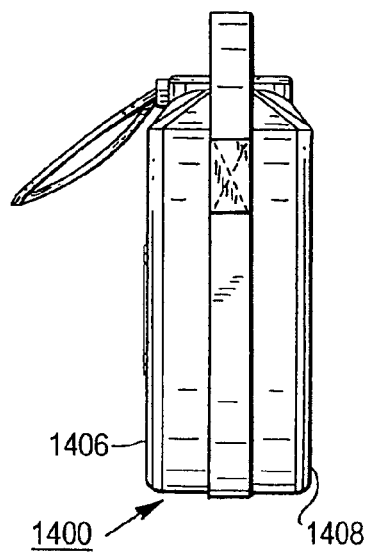
Figure 14C:
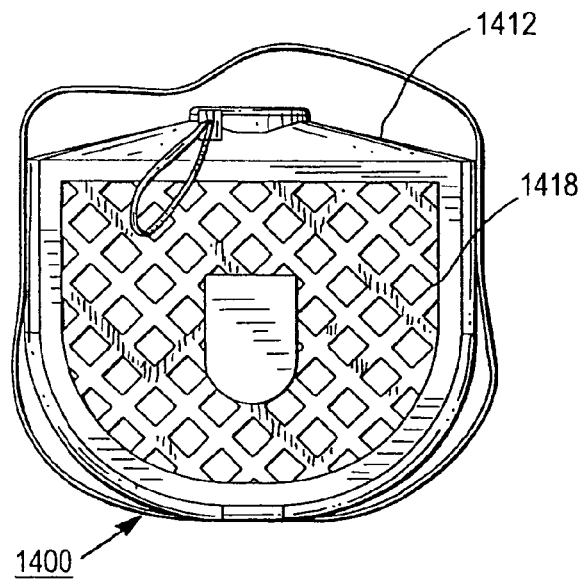
Figure 14D:
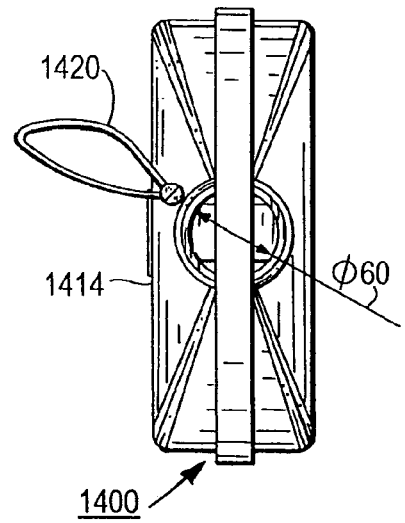

FIG. 13 depicts a coiling jig 1300 for coiling the illuminable safety rope 100 of the present invention in a serpentine arrangement for placement into a rope bag, such as, for example, the rope bag 1202 of FIG. 12 or a floatable marine throw rope bag 1400 of FIG. 14, which is described hereafter. The coiling jig 1300 includes a pair of opposing elongated members $1302_1$ and $1302_2$ (collectively elongated members 1302) and a cross-member $1304_1$ and $1304_2$ (collectively cross-members 1304) coupled at each end of the opposing elongated members 1302. As shown in FIG. 13, the cross-members 1304 are coupled to the bottom of the elongated members 1302. Each elongated member 1302 includes a plurality of undulations 1306. As shown in FIG. 13, the first elongate member $1302_1$ includes a first group of undulations $1306_1$ and the second elongate member $1302_2$ includes a second group of undulations $1306_2$. The plurality undulations $1306_1$ and $1306_2$ of each elongated member $1302_1$ and $1302_2$ oppose each other to define a plurality of opposing paired undulations $1308_1$ through $1308_q$ (collectively paired undulations 1308), with each opposing paired undulations 1308 being spaced apart from a next pair of paired undulations a distance "S" to systematically receive a portion of the safety rope 100 wrapped there around.

The coiling jig 1300 can be fabricated from a metal such as aluminum, among other metals or alloys, or a lightweight plastic material, such as PVC (polyvinylchloride) and the like by an injection molding process. The jig 1300 can be formed as a single continuous loop or formed in sections, which can be snap-fitted, mated, or otherwise secured together with fasteners.

During the coiling operation of the safety rope 100, portions of the length of the safety rope are wrapped around the opposing pairs of undulations 1308 sequentially to form a serpentine configuration. For example, the coiling process begins at the first paired undulations $1308_1$, where one end of the safety rope is coiled around the paired undulations $1308_1$ until approximately the space "S" between the first paired undulations $1308_1$ and the second paired undulations $1308_2$ is less than half filled with the partially coiled rope. The coiling process then progresses to the second paired undulations $1308_2$ and continues sequentially to each paired undulation in a similar manner until the rope is completely coiled around one or more pairs of undulations 1308. In one embodiment, the rope is coiled approximately 8-10 times around each paired undulations 1308. The rope is then removed from each paired undulation and stacked to for a single coiled rope having a serpentine configuration.

As different individuals may coil the rope 100 around the paired undulations 1308 with varying degrees of tautness (i.e., tightly wound or with slack), preferably each undulation extends upward normal to the elongated members at an angle "A" in a range of approximately eighty to ninety degrees. As shown in FIG. 13, the paired undulations 1308 extend upward and slope inwards towards each other until the undulations terminate at the apex, which is illustratively curved. The angled or inwardly sloped rising undulations allow the safety rope to be easily removed from each paired undulation 1308, even is coiled thereabout in a tightly wrapped manner.

Although the jig 1300 is illustratively shown positioned horizontally, for example, on a floor or table, a person of ordinary skill in the art will appreciate that the coiling jig 1300 can be mounted to a vertical wall with fasteners. Once the coiled safety rope is removed and stacked to form the serpentine coiled rope, it can be inserted into a rope bag, such as the rope bags of FIGS. 12 and 14.

Referring now to FIGS. 14A-14D, a floating rope bag 1400 suitable for storing and deploying the illuminable safety ropes, such as the rope embodiments 800 and 900 of FIG. 8 or 9, is illustratively shown. In one embodiment, the floating rope bag 1400 is formed as a container 1402 having at least one wall defining an enclosure therein with a single opening 1404 formed in the wall 1402. As shown in the figures, the container 1402 includes opposing first and second walls 1406 and 1408, a sidewall 1410 positioned between the first and second walls 1406 and 1408, and a top portion 1412. An opening 1414 is illustratively formed at the top portion 1412 to receive and deploy the rope therefrom. The opening 1414 can include a tie strap 1420 to control the aperture size of the opening 1414. For example, when the coiled rope is inserted into the floating rope bag 1400, the opening 1414 is fully opened. During use, the opening can be partially closed to fit loosely around the cross-sectional dimensions of the safety rope to prevent entanglement as the coiled rope unravels, as described below in further detail.

The floating rope bag 1400 can be fabricated from a lightweight buoyant material, such as polypropylene and the like, and is sized and dimensioned to store and deploy a safety rope, such as a 50 ft, 75 ft or 100 ft safety rope 800, 900. Preferably at least one wall, (e.g., front, rear, side and/or top wall) is transparent or includes transparent or translucent portions or windows 1418 thereon.

During use, a responder standing on a deck, landing or other structural or land-base surface adjacent to water can throw the floatable rope bag 1400 with the safety rope 800 or 900 coiled inside to a person or persons in the water. Specifically, a first end $106_1$ of the rope is attached to a fixed object and the power module 300 is activated, as described above with respect to the rope bag 1200 of FIG. 12. The second end $106_2$ of the rope is preferably attached to a fastener (not shown) provided in the interior of the floatable rope bag 1400 in a similar manner as described with the rope bag 1200 of FIG. 12.

A strap 1416 is fastened loosely around the sidewall 1410, and preferably has enough slack to enable a person to grab the strap 1416 during a rescue operation. The strap 1416 can be used by a responder to throw the floating rope bag 1400 with the floatable safety rope 800, 900 therein to the person who is in the water. On the other end of the rescue mission, the person in the water can reach out and grab the strap 1416 and hold on to it while being towed in.

Advantageously, the floating rope bag 1400 will not submerge, thereby allowing the person being rescued to easily grab the bag. Furthermore, the floating safety rope 800 or 900 is illuminated to further assist the person being rescued to see the illuminated floating rope on the surface of the water, and through the transparent panels or windows in the floating rope bag 1400. The combination floating safety rope 800, 900 and floating rope bag 1400 together form a rescue deployment system that is very useful for night time water rescue operations.

Referring to FIGS. 15-17, a rescue deployment system that spools the safety rope 100 is illustratively shown. Referring to FIG. 15, a reel 1500 includes a spool 1502, a rear flange or base pane 1504 and a front flange 1506. The front flange 1506 and rear flange 1504 extend radially outward from a front and rear end of the spool 1502 to form the reel 1500. Preferably, the front flange 1506 is fabricated from a flexible resilient material, such as PP (polypropylene), and the like. The reel 1500 is sized to wrap the length of the illuminable safety rope 100 about the spool 1502 within the confines of the front flange 1506 and rear flange 1504. The reel 1500 is illustratively shown to have an oval shape, but such shape is not considered limiting. The spool 1502 and opposing flanges 1504 and 1506 can be fabricated from a lightweight polypropylene sheets covered by heat resistant fabric, such as PVC with well-known fire retardant additives and the like, although these materials are not considered limiting.

At least one strap 1508 is provided to the back of the rear flange 1504 to enable a responder to carry the reel 1500 over their shoulder and down their back. The reel 1500 can be used to store and deploy any of the aforementioned embodiments of the illuminable safety rope described above.

A central compartment 1510 of the spool 1502 can be used for storage and to secure the power source 300 and an optional spare battery pack 1512, thereby making the reel 1500 a self contained safety rope deployment system. The first end 106$_1$ of the safety rope 100 is coupled to the power source 300 in a manner as described above with respect to FIGS. 1-3. The second end 106$_2$ of the safety rope 100 can include a carabiner 1210 for attachment to a fixed object, such as pole, other structure or even another person.

Referring to FIG. 16, a case 1600 for storing the reel 1500 is illustratively shown. The case 1600 can be fabricated from a lightweight heat resistant material, such as PVC with fire retardant additives and the like, and is shaped and dimensioned to receive the reel 1500. The illustrative case includes at least one sidewall 1610, rear panel 1612 and front panel 1614 to form an interior compartment 1604 to cover the reel 1500. Preferably, the front panel and sidewall include a zipper 1608 to open and close the compartment 1604. In one embodiment, the case 1600 is sized larger than the reel 1500 and can include a pocket for inserting an optional battery charger 1618 or other safety equipment. The case also can include one or more straps 1602 to carry the case 1600 with the reel 1500 stowed inside. A transparent window 1616 can be provided to view the power supply 300 to ensure that is properly turned off during non-use. In one embodiment, the case includes clips for snap-fitting with aligned clips (not shown) on the back of the reel 1500

Referring now to FIG. 17, a responder, such as a rescue worker or fireman 1700 is illustratively shown carrying the reel 1500 over a shoulder and down his/her back during deployment. The second end 106$_2$ is attached to a fixed object, such as a pole or other structure, the power source 300 is turned on, and the responder 1700 walks in a direction away from the fixed object to the site where the rescue operation is to be performed. As the responder 1700 moves in a forward direction, the illuminable safety rope 100 unravels along the edge of the front flange 1506. The safety rope 100 unravels at an angle substantially perpendicular to the front flange 1506 to maintain a taut rope. Advantageously, the flexible front flange 1506 will bend to allow the safety rope 100 to unwind, even if the rescuer is forced to crawl, bend over or otherwise assume a substantially horizontal position with respect to the floor below.

The present invention provides an illuminable safety rope and deployment system that is advantageous over currently available ropes and deployment systems. In particular, the safety ropes of the present invention are lightweight and provide a diffused light that will illuminate and be seen even in smoke filled environments. The illuminating safety rope can fabricated to illuminate in various colors for different environments. For example, a blue or a green luminescent can be provide in safety ropes used in fire hazards, while red, yellow or orange colors can be used in marine environments. Further, the illuminable safety ropes can be formed in different lengths for different applications. Preferably, the safety ropes are essentially flat (though not limiting), as opposed to being a generally circular diameter. A flat safety rope provides greater surface area that can be illuminated compared to a circular rope, and can be readily slipped under doors or other narrow confines. Moreover, the flat safety rope is less prone to knot, and thereby less likely to tangle or snag than a generally circular rope.

The flange portion of the EL cable is an ideal structure to position floatation material, reinforcing wires or strands, or electrical wiring next to or over to provide additional feature, such as giving the rope the ability to float, adding strength to the rope, and enabling distress signals to be sent to others. Moreover, distance markers can be easily provided over the flat surface areas of the safety rope to aid a rescuer in hazardous conditions.

The illuminable safety rope can be powered by a conventional portable AC power source. Preferably, the power source can be equipped with a switch to change modes of operation from continuous illumination to intermittent (blinking) operation. Alternatively, a separate operational mode switch can readily be added to the safety rope to control the mode of operation.

In one embodiment, a floatable rope bag can be provided to enhance rescue operations in the water. The floatable rope bag has transparent portions which enable a victim to better see both the bag and illuminated safety rope when the rope bag and illuminated rope therein are thrown to such person being rescued.

In another embodiment, the illuminable safety rope can be coiled around a spool of a reel and carried on a rescuer's back. In this manner, the rescuer's hands are left free to help the person being rescued or perform other functions during the operation.

A coiling jig is also provided to assist in coiling the illuminable safety rope in a serpentine configuration. The serpentine configuration helps prevent entanglements and neatly stacks the adjacent flat surfaces of the safety rope to reduce volume during storage.

Although various embodiments that incorporate the teachings of the present invention have been shown and described in detail herein, those skilled in the art can readily devise many other and varied embodiments that incorporate these teachings, and the scope of the invention is to be determined by the claims that follow.

What is claimed is:

1. An illuminable safety rope comprising:
   an illuminable wire having a predetermined length surrounded by a light-transmitting, insulative covering to thereby form an illuminable cable, the insulative covering having a flange extending radially outward along the length of the illuminable cable, the flange being defined by opposing side portions and terminating at an edge portion; and
   a fabric material disposed over and secured to the opposing side portions and edge portion of the flange and extending along at least the length of the illuminable cable to thereby cover the flange and form the safety rope, and wherein the length of the illuminable cable includes a visibly exposed portion that illuminates the safety rope along its length when the illuminable wire receives power.

2. The illuminable safety rope of claim 1, wherein the illuminable wire comprises electroluminescent (EL) wire.

3. The illuminable safety rope of claim 1, wherein the illuminable wire comprises fiber optic wire.

4. The illuminable safety rope of claim 1, wherein the illuminable wire comprises light emitting diodes.

5. The illuminable safety rope of claim 1, wherein the fabric material is secured to the opposing side portions of the flange by stitching.

6. The illuminable safety rope of claim 1, wherein the opposing ends of the fabric material extend a length greater than the length of the opposing ends of the illuminable cable.

7. The illuminable safety rope of claim 1, further comprising a reinforcing wire extending the length of the illuminable cable, the reinforcing wire being positioned adjacent to the edge portion of the flange, and wherein the fabric is disposed over the reinforcing wire.

8. The illuminable safety rope of claim 1, further comprising a reinforcing wire extending the length of the illuminable cable, the reinforcing wire being positioned adjacent to one of the side portions of the flange, and wherein the fabric is disposed over the reinforcing wire.

9. The illuminable safety rope of claim 1, further comprising a pair of reinforcing wires extending the length of the illuminable cable, the pair of wires being positioned proximate to the edge portion of the flange, and wherein the fabric is disposed over the pair of reinforcing wires.

10. The illuminable safety rope of claim 9, where the pair of wires are connected to a power source and an alarm to provide a distress signal in response to activation of a switch.

11. The illuminable safety rope of claim 1, further comprising a floatation material extending the length of the illuminable cable, the floatation material being positioned adjacent to at least one of the opposing side or edge portions of the flange, and wherein the fabric is disposed over the floatation material.

12. The illuminable safety rope of claim 1, further comprising a floatation material extending the length of the illuminable cable, the floatation material circumscribing the opposing side and edge portions of the flange, and wherein the fabric is disposed over the floatation material.

13. The illuminable safety rope of claim 1, further comprising a portable power source, said power source including an inverter for converting DC voltage to AC current.

14. The illuminable safety rope of claim 13, wherein the power source further comprises an operational mode switch for illuminating the safety rope intermittently or continuously.

15. The illuminable safety rope of claim 1, further comprising a plurality of protruding markings provided at predetermined intervals over the fabric along the length of the illuminable safety rope, wherein different groupings of said plurality of protruding markings represent different distances along the length of the safety rope.

16. An illuminable safety rope system comprising:
   an illuminable wire having of predetermined length surrounded by a light-transmitting insulative covering to thereby form an illuminable cable, the insulative covering having a flange extending radially outward along the length of the illuminable cable, the flange being defined by opposing side portions and terminating at an edge portion;
   a fabric material disposed over and secured to the opposing side portions and edge portion of the flange and extending along at least the length of the illuminable cable to thereby cover the flange and form the safety rope; and wherein at least a portion of the illuminable cable opposite the flange transmits light to illuminate the safety rope along its length when the illuminable wire receives power; and
   a housing for storing and deploying the illuminable safety rope.

17. The illuminable safety rope system of claim 16, wherein the housing comprises:
   a container having a first wall, a second wall and at least one side wall positioned between the first and second walls and defining an interior portion of the container for receiving the illuminable safety rope;
   an opening formed in one of the first, second or at least one side wall of the container, the opening being sized and positioned to receive and deploy the safety rope; and
   a fastener positioned within the interior of the container for fastening an end of the safety rope to the container.

18. The illuminable safety rope system of claim 17, wherein at least one of the first, second and at least one side wall are fabricated from a translucent or transparent material.

19. The illuminable safety rope system of claim 16, wherein the housing comprises:
   a spool, a rear flange and a front flange, the front flange and rear flange extending radially outward from a opposing ends of the spool to form a reel, said reel being sized to wrap the length of the illuminable safety rope about the spool within the confines of the front and rear flanges.

20. A method of fabricating an illuminable safety rope comprising:
   providing an illuminable wire of predetermined length;
   placing a light-transmitting insulative covering over the illuminable wire along the length to thereby form an illuminable cable, the insulative covering having a flange extending radially outward along its length, the flange being defined by a opposing side portions and terminating at an edge portion;
   disposing a fabric material over the opposing side portions and edge portion of the flange along at least the length of the illuminable cable; and
   securing the fabric material to the flange to thereby form the safety rope, wherein the length of the illuminable cable includes a visibly exposed portion that transmits light to illuminate the safety rope along its length when the illuminable wire receives power.

* * * * *